(12) United States Patent
Guiheneuf et al.

(10) Patent No.: US 7,383,291 B2
(45) Date of Patent: Jun. 3, 2008

(54) METHOD FOR SHARING GROUPS OF OBJECTS

(75) Inventors: Bertrand Guiheneuf, Paris (FR); Sébastien Maury, Paris (FR); Olivier Gutknecht, Paris (FR); Julien Jalon, Paris (FR); Scott Ryder, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 190 days.

(21) Appl. No.: 10/853,546

(22) Filed: May 24, 2004

(65) Prior Publication Data

US 2005/0262164 A1 Nov. 24, 2005

(51) Int. Cl.
 *G06F 17/30* (2006.01)
(52) U.S. Cl. .................. 707/203; 707/104.1; 705/8; 715/765
(58) Field of Classification Search ................ None
See application file for complete search history.

(56) References Cited

U.S. PATENT DOCUMENTS

| | | |
|---|---|---|
| 4,937,743 A | 6/1990 | Rassman et al. |
| 5,129,057 A | 7/1992 | Strope et al. |
| 5,247,438 A | 9/1993 | Subas et al. |
| 5,323,314 A | 6/1994 | Baber et al. |

(Continued)

FOREIGN PATENT DOCUMENTS

EP  0276427  8/1988

(Continued)

OTHER PUBLICATIONS

VAitA, OsaSync Frequently Asked Questions, Feb. 4, 2004 http://web.archive.org/web/20040204195815/http://www.vaita.com/faq.asp.*

(Continued)

*Primary Examiner*—Hosain Alam
*Assistant Examiner*—Christopher J Raab
(74) *Attorney, Agent, or Firm*—Blakely, Sokoloff, Taylor & Zafman LLP

(57) ABSTRACT

A method of sharing a group of one or more objects between a plurality of users, in which one or more of said plurality of users is able to change parameter data of at least one said object. The method comprises storing at least one version of each said object; when an object is changed, creating a new version of the object, the new version of the object comprising additional data relating to the creation of the new version; storing the new version of the object together with any version of that object before the change; providing all versions of the object to each of said plurality of users; and using the additional data provided for each version of the object to determine how to display the object. The group may be a calendar and each object may be an event in the calendar. In that case, the object parameter data may comprise a start time of the event, an end time of the event, a description of the event, a status of the event, whether the event is to be repeated and the persons attending the event. The additional data may comprise an identification of the user who made the change, a time at which the change was made, a description of the change, a user comment relating to the change and an identification of the previous version of the event from which the present version was created.

45 Claims, 10 Drawing Sheets

U.S. PATENT DOCUMENTS

| | | |
|---|---|---|
| 5,457,476 A | 10/1995 | Jenson |
| 5,500,938 A | 3/1996 | Cahill et al. |
| 5,528,745 A | 6/1996 | King et al. |
| 5,621,458 A | 4/1997 | Mann et al. |
| 5,621,876 A | 4/1997 | Odam et al. |
| 5,634,100 A | 5/1997 | Capps |
| 5,659,768 A | 8/1997 | Forbes et al. |
| 5,664,063 A | 9/1997 | Johnson et al. |
| 5,761,646 A | 6/1998 | Frid-Nielsen et al. |
| 5,805,163 A | 9/1998 | Bagnas |
| 5,838,889 A | 11/1998 | Booker |
| 5,842,009 A | 11/1998 | Borovoy et al. |
| 5,855,006 A | 12/1998 | Huemoeller et al. |
| 5,860,067 A | 1/1999 | Onda et al. |
| 5,895,451 A | 4/1999 | Yamade et al. |
| 5,899,979 A | 5/1999 | Miller et al. |
| 5,960,406 A | 9/1999 | Rasansky et al. |
| 6,039,355 A | 3/2000 | Durand |
| 6,064,975 A | 5/2000 | Moon et al. |
| 6,085,166 A | 7/2000 | Beckhardt et al. |
| 6,101,480 A | 8/2000 | Conmy et al. |
| 6,167,379 A | 12/2000 | Dean et al. |
| 6,222,549 B1 | 4/2001 | Hoddie |
| 6,243,325 B1 | 6/2001 | Tomono |
| 6,278,456 B1 | 8/2001 | Wang et al. |
| 6,369,840 B1 | 4/2002 | Barnett et al. |
| 6,380,959 B1 | 4/2002 | Wang et al. |
| 6,466,236 B1 | 10/2002 | Pivowar et al. |
| 6,604,079 B1 | 8/2003 | Ruvolo et al. |
| 6,728,530 B1 | 4/2004 | Heinonen et al. |
| 6,738,789 B2 | 5/2004 | Multer et al. |
| 6,785,868 B1 | 8/2004 | Raff |
| 6,868,426 B1 | 3/2005 | Mankoff |
| 7,007,041 B2 | 2/2006 | Multer et al. |
| 7,039,596 B1 | 5/2006 | Lu |
| 2001/0044805 A1 | 11/2001 | Multer et al. |
| 2001/0049617 A1* | 12/2001 | Berenson et al. ............... 705/8 |
| 2002/0010807 A1 | 1/2002 | Multer et al. |
| 2002/0131565 A1 | 9/2002 | Scheuring et al. |
| 2002/0184321 A1 | 12/2002 | Fishman et al. |
| 2002/0191035 A1 | 12/2002 | Selent |
| 2002/0196280 A1 | 12/2002 | Bassett et al. |
| 2003/0045301 A1 | 3/2003 | Wollrab |
| 2003/0050986 A1 | 3/2003 | Matthews et al. |
| 2003/0065677 A1* | 4/2003 | Culp et al. ............... 707/104.1 |
| 2003/0065742 A1 | 4/2003 | Culp et al. |
| 2004/0039779 A1 | 2/2004 | Armstrong et al. |
| 2004/0073615 A1 | 4/2004 | Darling |
| 2004/0125142 A1 | 7/2004 | Mock et al. |
| 2004/0136404 A1 | 7/2004 | Mahonen et al. |
| 2005/0125737 A1 | 6/2005 | Allen et al. |
| 2005/0222971 A1 | 10/2005 | Cary |

FOREIGN PATENT DOCUMENTS

| | | |
|---|---|---|
| WO | WO 00/62146 | 10/2000 |
| WO | WO 00/62201 A1 | 10/2000 |
| WO | WO 01/49051 A1 | 7/2001 |
| WO | WO0149051 * | 7/2001 |
| WO | WO 02/44958 A1 | 6/2002 |
| WO | WO 02/089026 A2 | 11/2002 |

OTHER PUBLICATIONS

WindowsITPro, Replying To And Forwarding Messages, Jun. 6, 2003 http://web.archive.org/web/20030625191716/http://www.windowsitlibrary.com/Content/191/11/2.html.*

Bisignano, Mario, et al., Expeerience: a Jxta middleware for mobile ad-hoc networks, Proceedings of the Third International Conference on Peer-to-Peer Computing (P2P'03) 2003 IEEE, 2 pages.

Paluska, Justin Mazzola, et al., Footloose: A Case for Physical Eventual Consistency and Selective Conflict Resolution, Proceedings of the Fifth IEEE Workshop on Mobile Computing Systems & Applications (WMCSA 2003) 2003 IEEE, 10 pages.

Prasad, Sushil K., et al., Enforcing Interdependencies and Executing Transactions Atomically Over Autonomous Mobile Data Stores Using SyD Link Technology, Proceedings of the 23$^{rd}$ International Conference on Distributed Computing Systems Workshops (ICDCSW'03) 2003 IEEE, 7 pages.

Prasad, Sushil K., et al., Implementation of a Calendar Application Based on SyD Coordination Links, Proceedings of the International Parallel and Distributed Processing Symposium (IPDPS'03) 2003 IEEE, 8 pages.

PCT Notfication Of Transmittal Of The International Search Report And The Written Opinion Of The International Searching Authority, Or The Declaration, for PCT International Appln. No. US2005/014619, mailed Sep. 2, 2005, (11 pages total).

F.Dawson and D. Stenerson: "Internet Calendaring and Scheduling Core Object Specification (iCalendar)", Network Working Group, Request for Comments: 2445, Nov. 1998.

B. Mahoney, G. Babics, A. Taler: "Guide to Internet Calendaring", Network Working Group, Request for Comments: 3283, Jun. 2002.

PCT International Search Report for PCT Int'l. Appl. No. US03/28247, mailed Feb. 13, 2004 (6 pages).

PCT Notification of Transmittal of the International Search Report or Declaration for PCT Int'l. Appln. No. US03/28053, mailed Jun. 18, 2004 (5 pages).

D. Beard, M. Palanlappan, A. Humm, D. Banks, A. Nair, Y. Shan: "A Visual Calendar for Scheduling Group Meetings", Department of Computer Science, University of North Carolina, Chapel Hill, Oct. 1990 (pp. 279-290).

PCT Written Opinion for PCT International Appln. No. US03/28247, mailed Aug. 16, 2004 (5 pages).

PCT International Preliminary Examination Report for PCT Int'l. Appln. No. US03/28247, mailed Feb. 25, 2005 (6 pages).

PCT Written Opinion for PCT International Appln. No. US03/28053, mailed Sep. 16, 2004 (5 pages).

PCT International Preliminary Examination Report for PCT Int'l. Appln. No. US03/28053, mailed Mar. 3, 2005 (6 pages).

Timecruiser Computer Corporation, "Timecruiser User Guide", Version 1.5, Jul. 1998, downloaded on Aug. 3, 2005 at https://www.atd.net/timecruiser/doc, pp. 1-50.

De Herrera, Chris. "Microsoft ActiveSync 3.1," *Pocket PC FAQ* (2000), downloaded from the Internet at: http://www.pocketpcfaq.com/wce/activesync3.1.htm (pp. 1-9).

Supplementary European Search Report for EP Application No. 03794665.4, dated Aug. 30, 2006 (3 pages).

PCT International Preliminary Examination Report for PCT International Appln. No. US2005/014619, mailed Dec. 7, 2006 (7 pages).

* cited by examiner

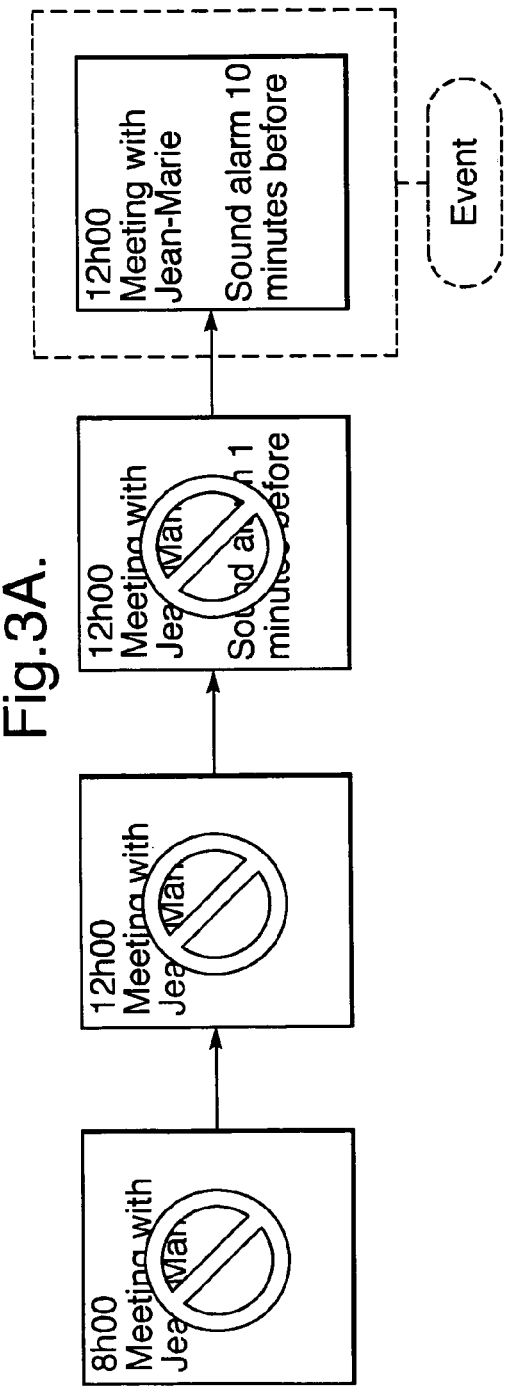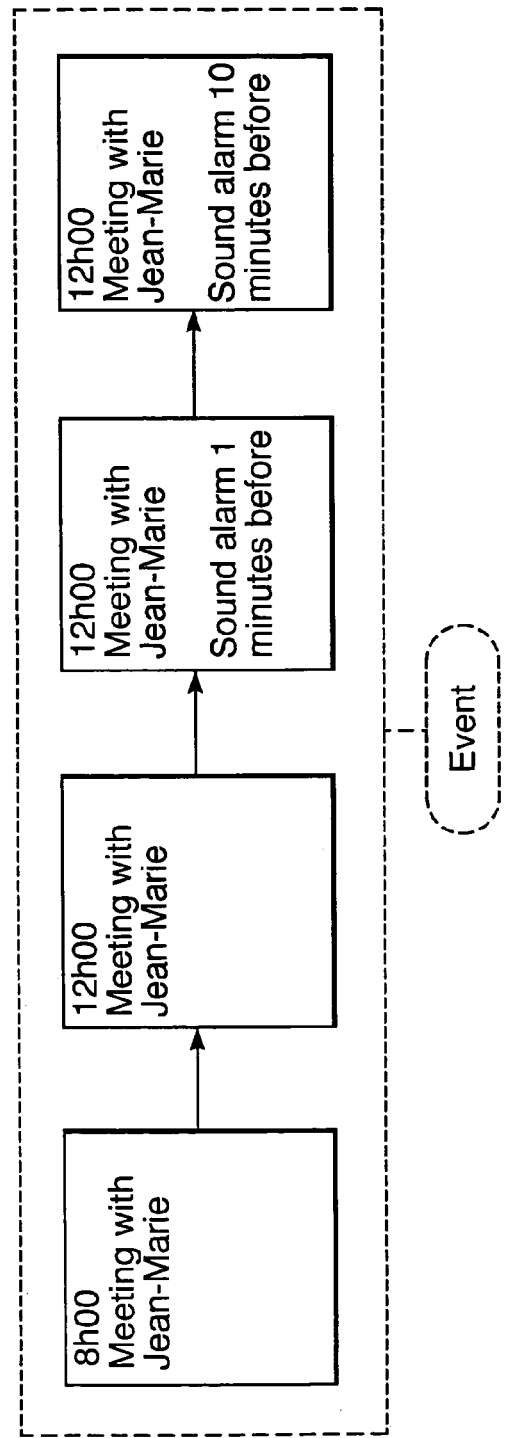

Fig.7.

| Step | User 1 | User 2 | User 3 |
|---|---|---|---|
| 1 | $V_0$ | - | - |
| 2 | $V_0$ | $V_0$ | $V_0$ |
| 3 | $V_0$ | $V_0\ V_1$ | $V_0$ |
| 4 | $V_0\ V_1$ | $V_0\ V_1$ | $V_0$ |
| 5 | $V_0\ V_1$ | $V_0\ V_1$ | $V_0\ V_{1'}$ |
| 6 | $V_0\ V_1\ V_{1'}$ | $V_0\ V_1\ V_{1'}$ | $V_0\ V_{1'}\ V_1$ |
| 7 | $V_0\ V_1\ V_{1'}$ | $V_0\ V_1\ V_{1'}$ | $V_0\ V_1\ V_{1'}$ |

Fig.8.

| Step | User 1 | User 2 | User 3 |
|---|---|---|---|
| 1 | $W_0$ | - | - |
| 2 | $W_0$ | $W_0$ | $W_0$ |
| 3 | $W_0$ | $W_0\ W_1$ | $W_0$ |
| 4 | $W_0$ | $W_0\ W_1$ | $W_0\ W_{1'}$ |
| 5 | $W_0\ W_{1'}$ | $W_0\ W_1$ | $W_0\ W_{1'}$ |
| 6 | $W_0\ W_{1'}\ W_1$ | $W_0\ W_1\ W_{1'}$ | $W_0\ W_{1'}\ W_1$ |
| 7 | $W_0\ W_1\ W_{1'}$ | $W_0\ W_1\ W_{1'}$ | $W_0\ W_1\ W_{1'}$ |

Fig.12.

| Step | User 1 | | User 2 | | User 3 | |
|---|---|---|---|---|---|---|
| 1 | $X_{00}$ | □ | - | | - | |
| 2 | $X_{00}$ | □ | $X_{00}$ | □ | $X_0$ | □ |
| 3 | $X_{00}$ | □ | $X_{00}\ X_x$ | | $X_{00}\ X_x$ | □ |
| 4 | $X_{00}\ X_x$ | ⌧ | $X_{00}\ X_x$ | | $X_{00}\ X_x$ | ⌧ |
| 5 | $X_{00}\ X_x$ | ⌧ | $X_{00}\ X_x$ | | $X_{00}\ X_x$ | |
| 6 | $X_{00}\ X_x\ X_{01}$ | □ | $X_{00}\ X_x$ | | $X_{00}\ X_x$ | |
| 7 | $X_{00}\ X_x\ X_{01}$ | □ | $X_{00}\ X_x\ X_{01}$ | □ | $X_{00}\ X_x\ X_{01}$ | □ |

METHOD FOR SHARING GROUPS OF OBJECTS

FIELD OF THE INVENTION

The present invention relates to sharing a group of objects, such as a calendar of events or a collection of images, between two or more users. Preferably, each user is able to access the group by means of a networked device, such as a laptop or other computer.

DESCRIPTION OF THE PRIOR ART

There are several available computer program applications that allow multiple users the facility of collaborative scheduling through sharing of calendars and the electronic sending of invitations. These include Lotus™, Exchange™, Meeting Maker™ and Outlook™. These known applications are designed, amongst other things, to allow users to view lists of attendees for meetings to which they are invited; to use e-mail to correspond with others; to send file attachments and respond to meeting and task requests; to schedule meetings and reserve locations and equipment; to share schedules with others in their workgroup; and to assign colleagues permission to read, modify or create items in their public or private folders.

As an example, in one known application a user may view the public calendars of all those he wishes to invite to a meeting in order to establish an appropriate time and place for the meeting. Based on this, the organiser may select a particular time and place for a meeting and invite various colleagues to the meeting. The invitees may accept or propose an alternative time and/or place. The organiser may then decide whether and how to reschedule the meeting and transmit his decision to the invitees. Accordingly, all control for scheduling of the meeting is held by the organiser and the invitees act as little more than passive respondents to information.

In another known application, a server holds data for the calendars of a plurality of users. Each user may have one or more calendars. The holder of a calendar or an administrator assigns access to the calendar to the desired other users. The access may allow the other users to read the calendar only or to effect changes to, or edit, the calendar. To gain access, a user must be networked to the server.

In a further known application, a user stores the data for his calendar in his own user device, such as his laptop computer. Other devices could include a desktop computer, a Palm™ or other personal organiser and even a mobile phone. The user may elect to publish his calendar to a selected group of other users, for example using a .Mac™ server. To publish his calendar, the user must upload it to the server. Each time one of the group of other users logs on to the network and subscribes to the calendar, he is able to view the most recently published version of that calendar. He may then contact the first user to suggest changes to the calendar. However, he is not able to edit the calendar himself. Again, specific server software is required and all the calendar data must be stored in a predetermined format compatible with the server software and the communication protocol between the server and the devices on which the calendars are shared.

These well-known applications are heavily server-based and rely on particular calendar server software and communication protocols to allow users to share information on a network. A server will commonly store all information relating to all calendars in a particular format. Networked user devices must then access the server to obtain the required information. Any requests for changes to data must then be prepared in the correct format for successful transmission to the server. The server then effects the changes and stores the changed data for subsequent forwarding to other devices on the network when requested. In particular, the server will overwrite existing data. More specifically, the calendar will typically be stored by the server as a single file, which is then overwritten when the calendar is changed.

This places a number of strictures on collaborative applications such as calendar sharing. In particular, all devices must be fully compatible with a particular server, which itself must be programmed with calendar server software. Moreover, to view a calendar or effect any change to it a user must be networked to the server. Accordingly, remote changes are not possible. Moreover, collaborative scheduling between two or more persons away from the office or other specific network environment is not feasible. Thus, known applications involve providing a closed environment in which a single copy of a server software application is used by different people.

Consequently, a problem arises when it is desired to allow users to edit one another's calendars and the user's devices are not networked to the same server. For example, it may be desired to allow a user to share his calendar with other users by means of a .Mac™ server, a RendezVous™ network and another generic server and to allow the other users to edit the calendar. The possible sources of change to one event in the user's calendar would include a change from a .Mac™ server, a change from a RendezVous™ server, a change from another generic server, a local change made by the user on his device, and a synchronisation operation occurring when a user synchronises the data on his devices. In addition, an invitation sent by another user may create an event. Clearly, in this situation the use of dedicated calendar server software is undesirable, if not unfeasible. Prior art calendar-sharing applications do not provide the functionality of sharing data using different networks.

Moreover, known dedicated calendar software and the concomitant communication protocols are unable to cope appropriately with changes made by users offline. For example, it would be possible for a first user to share his calendar with a group of other users. It would be preferable to allow a second user to retrieve the shared calendar, edit the calendar offline and then share the change with the other users later, when he went online again. However, under these circumstances, before the second user went back on line, a third user could retrieve the shared calendar and make a different change to the calendar while still online. Despite being made after the second user's change and with the knowledge of more recent events, the third user's change would be shared before the second user's change and would be superseded by the second user's change when the second user went online again. This is undesirable and would lead to confusion.

It is particularly desirable to allow users to share calendars peer-to-peer. That is, to allow users to share calendars directly between devices without the intervention of a server. Prior art calendar-sharing applications do not provide this functionality.

SUMMARY OF THE INVENTION

The present invention is made with a view to overcoming these difficulties. In particular, the present invention provides A method of sharing a group of one or more objects between a plurality of users, in which one or more of said plurality of users is able to change parameter data of at least one said object. The method comprises storing at least one version of each said object; when an object is changed, creating a new version of the object, the new version of the object comprising additional data relating to the creation of the new version; storing the new version of the object together with any version of that object before the change; providing all versions of the object to each of said plurality of users; and using the additional data provided for each version of the object to determine how to display the object. The group may be a calendar and each object may be an event in the calendar. In that case, the object parameter data may comprise a start time of the event, an end time of the event, a description of the event, a status of the event, whether the event is to be repeated and the persons attending the event. The additional data may comprise an identification of the user who made the change, a time at which the change was made, a description of the change, a user comment relating to the change and an identification of the previous version of the event from which the present version was created.

BRIEF DESCRIPTION OF THE DRAWINGS

Embodiments of the present invention will now be described by way of further example only and with reference to the accompanying drawings, in which:

FIG. 3A is an illustration of a series of changes to an event according to the prior art;

FIG. 3B is an illustration of a series of changes to an event according to the present invention;

FIG. 7 is a table showing the transfer of information between three computers according to the present invention;

FIG. 8 is another table showing the transfer of information between three computers according to the present invention;

FIG. 12 is another table showing the transfer of information between three computers according to the present invention.

DETAILED DESCRIPTION

Figure 1:
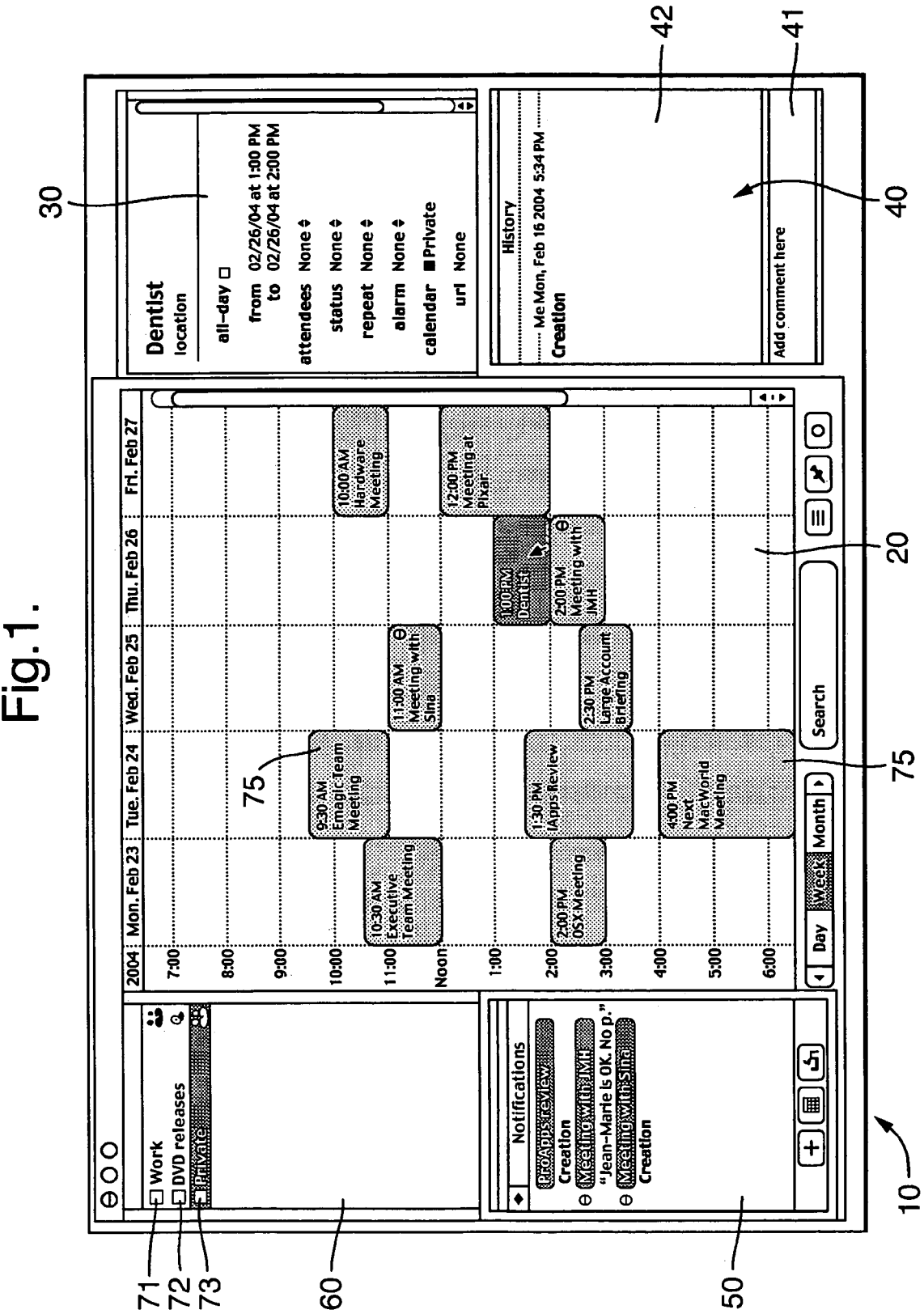
FIG. 1 is a view of a calendar user interface to which the present invention may be applied.

FIG. 1 is an illustration of a calendar user interface (UI) 10 to which the present invention may be applied. The UI 10 comprises a calendar main view 20, which displays events 75 over a selected time frame for one or more calendars. As shown by the calendar list 60, in the present example three calendars are displayed in the main view 10. These calendars are the user's work calendar 71, DVD release calendar 72 and private calendar 73. The private calendar 73 is shown in bold in the calendar list 60 and, correspondingly, events in the private calendar 73 are shown in bold in the calendar main view 20. The UI 10 further comprises an inspector window 30, which allows the parameters of a particular event in a calendar to be viewed. In the present example, the inspector 30 shows the scheduled time of a dentist appointment. Finally, the UI 10 includes a history window 40 and a notification window 50. These will be discussed in more detail below.

Figure 2:
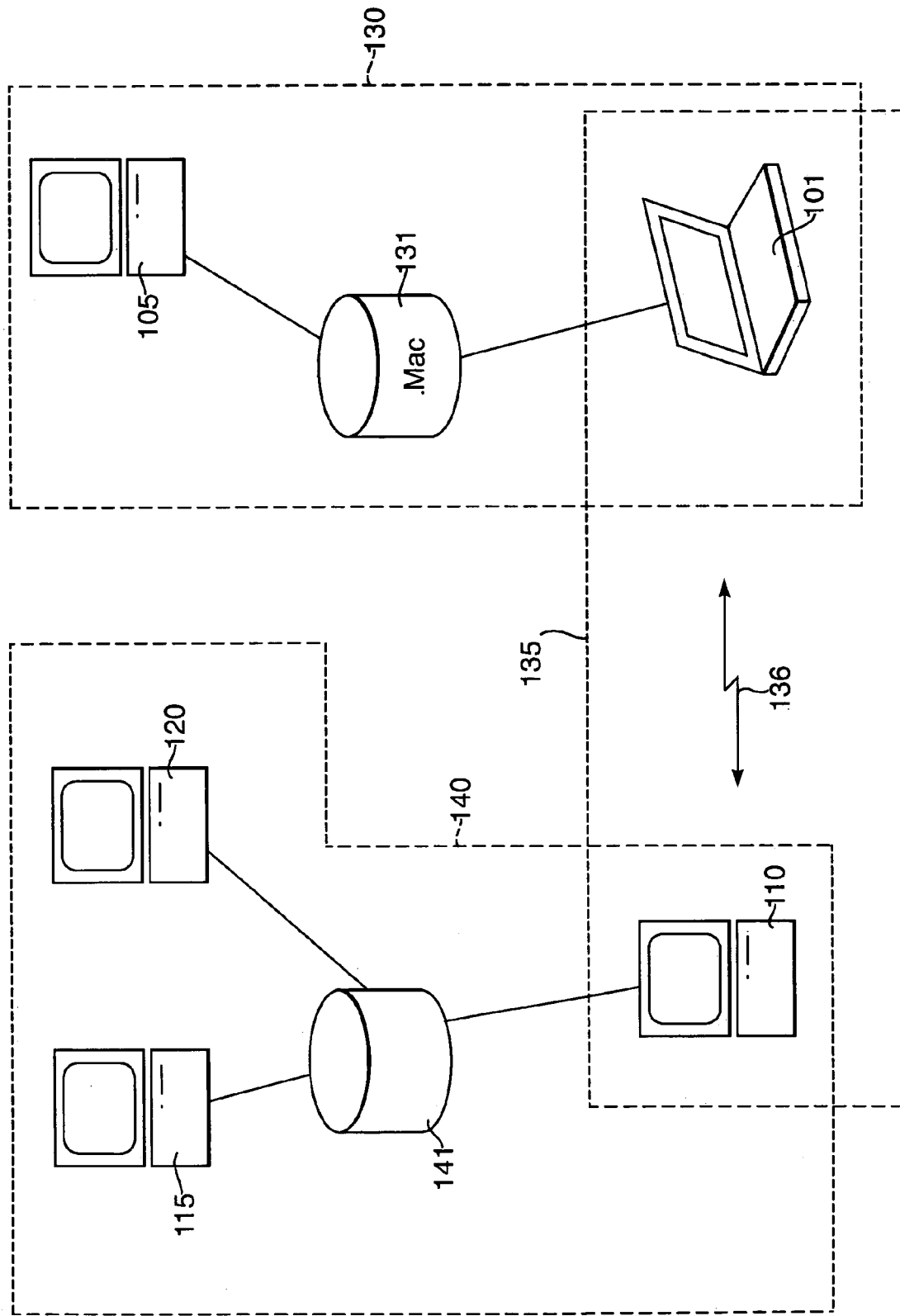
FIG. 2 is a schematic view of a network for sharing a calendar according to the present invention.

In a preferred embodiment of the present invention, each calendar may be shared by a plurality of users using one or more networks. FIG. 2 illustrates exemplary networks for sharing a calendar according to the present invention. In effect, FIG. 2 shows three interlinked networks 130, 135 and 140. The first network 130 comprises a laptop computer 101 and a desktop computer 105 networked over the Internet by means of a .Mac™ server 131. The second network comprises the laptop computer 101 networked to a second desktop computer 110 in a RendezVous™ network. A RendezVous™ network is a wireless network that eliminates the need to enter complicated Internet Protocol (IP) addresses or other information to set up devices on a network or locate people and other resources. Thus, when a "RendezVous™" device enters a RendezVous™ network, it is automatically detected and included in the network. Communications between devices in a RendezVous™ network are effected by wireless transmissions 136. The third network 140 comprises the second desktop computer 110, a local area network (LAN) server 141 and two further desktop computers 115 and 120 connected to the LAN server 141.

Each of the three user computers 101, 105 and 110 in the first and second networks may have a different user. For example, laptop 101 may have a first user, desktop 105 may have a second user and laptop 110 may have a third user. In this example, the second user is the wife of the first user and the third user is a work colleague of the first user. The first user has the three calendars shown in FIG. 1. As indicated by the "people" icons in the calendar list 60, the user shares his work and personal calendars with both the second and third users. That is, the second and third users are able to view the work and personal calendars of the first user at desktop computer 105 and desktop computer 110 respectively. Moreover, they are able to edit the work and personal calendars at their respective desktop computers 105 and 110 and to share the edited calendar with the other users.

For example, if the dentist were to contact the second user and change the time of the appointment to 12:00 PM, the second user would be able to view the first user's private calendar and edit the dentist appointment. Assuming both the first and second users are online, the change would then automatically be transmitted from the first desktop 105 to the laptop 101 by means of the .Mac™ server 131 and from the laptop 101 to the second desktop 110 by means of the RendezVous™ network. Accordingly, each user is able to view and edit any shared calendar and all changes are automatically transmitted to the other users.

In addition, the third user is also able to make changes to the first user's calendars and the changes are then shared with first user over the RendezVous™ network and subsequently with the second user by means of the .Mac™ server. Of course, further users may also be permitted to share and change the first user's calendars. For example, FIG. 2 further shows the second desktop computer 110 connected to a local area network (LAN) server 141, which is in turn connected to further desktop computers 115 and 120. The users of the further desktop computers 115 and 120 are able to view and edit the same calendar by means of interconnections with the second desktop computer 110 via the LAN server 141. Yet further users may access the shared calendars by means of the .Mac™ server 131, the RendezVous™ network 135 or yet another server. Indeed, the first laptop 101 may also be connected to the LAN server 141.

Accordingly, the possible sources of change to a single event in the user's calendar stored on the first laptop 101 include a change from the .Mac™ server 101, a change from the RendezVous™ network 135, a change from another generic server such as LAN server 140, a local change made by the user on the laptop, and a synchronisation operation occurring when a user synchronises the data on his devices, such as another laptop computer (not shown), a PDA (not shown) or a mobile phone (not shown). In addition, an invitation sent by another user may create an event. Clearly, in this situation the use of dedicated calendar server software is undesirable, if not unfeasible.

Moreover, changes to a calendar may be effected when some or all the relevant users are offline. As the users go online, the change is disseminated through the networks until all users sharing the calendar are correctly updated. Thus, there are many possible sources of change to events in each calendar and these changes can be made asynchronously—that is, changes may be made offline and without knowledge of other changes.

To achieve this functionality, the present invention considers each calendar as a collection of objects, each object being an event. The event comprises parameter data relating to the event. For example, the parameter data may comprise the start and end times of the event. These times will include the date of the event. The parameter data may also include a description of the event (for example, "dentist"), a status of the event (for example, "very important"), how many attendees there will be at the event and whether the event is to be repeated. In addition, the parameter data may include an indication of whether an alarm is to be sounded and, if so, how long before the event is due to start the alarm should be sounded.

Unlike the prior art, in which each calendar is stored as a single file, the present invention stores each calendar (or collection of objects) in a folder. When a new event such as a dentist appointment is created, the event is transmitted to all permitted sharers of the calendar. When the event is transmitted, all parameter data of the event are sent.

When a user makes a change to the event on his computer, a new version of the event is created and stored. The new version includes all the same categories of parameter data as the original event. However, some of this parameter data will have been changed. For example, FIG. 1 shows a dentist appointment between 1:00 PM and 2:00 PM. If the time of the appointment is changed so it is between 12:00 PM and 1:00 PM, the start time and end time parameter data will be changed in the new version but the remaining parameter data will be unchanged. When the user confirms the change, the new version with the new start and end time parameter data will be transmitted to all permitted sharers.

In the prior art, each previous version of the event is replaced or overwritten in the computer by the new version. This is illustrated in FIG. 3A, which shows that an event comprising a meeting at 8:00 AM with Jean Marie was initially created. This was subsequently changed to, and overwritten by, consecutively the same meeting at 12:00 PM; the same meeting at 12:00 PM with an alarm 1 minute before; and the same meeting at 12:00 PM with an alarm 10 minutes before. This last change forms the event and is sent in a format appropriate to the communication protocol required for communication between the computers used to share the calendar.

However, as shown by FIG. 3B, in the present invention all versions of the event are retained by each computer on which the calendar is shared. Thus, the computer uses all versions of the event to establish how the event should be treated. To allow the computers used to share the calendar to distinguish between different versions of an event, the computer on which the change is made further provides the new version with additional data that relates to the change of the event. This additional data may be termed metadata and preferably includes the time at which the change was made or the new version created. The metadata preferably also includes an identification of the previous version of the event from which the current version was created, an identification of the user who made the change, a description of the change and a user comment relating to the change.

Effectively then, an event comprises a set of versions. Each version comprises at least some metadata that will be useful to the computers used to share the calendar, in particular to deduce how to treat the different versions of the event and how to display the event. However, there is no requirement for the versions to be ordered. Thus, the communication protocol used to share the calendar between computers can be metadata agnostic. This has the significant advantage that the calendar data need not be stored in any specific format and no specific calendar server software need be provided. Instead, any server software that is capable of storing different versions of the same object can be used to communicate data between calendar-sharing computers. Alternatively, computers are able to share calendar data peer-to-peer, without the intervention of a server at all.

Figure 4:
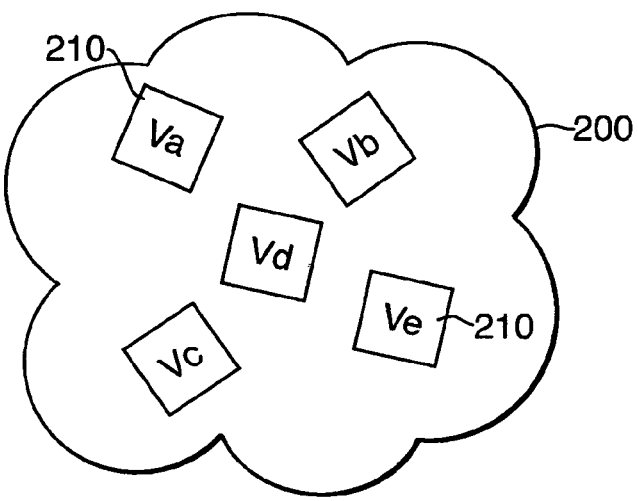
FIG. 4 is an illustration of an object according to the present invention.

FIG. 4 shows how an event 200 can be conceived as a sack of unordered versions 210. Specifically, Va, Vb, Vc, Vd and Ve are simply different versions of event V and are stored entirely unordered in the communication protocol. In addition, each version will include additional metadata. For example, assume the metadata is a list of the previous versions already present in the event 200 when a new version is created. In addition, suppose that the notation Va (Vc, Vd) signifies that when Va was created, Vc and Vd were already present in the event 200. With the following information:

Vb (Ve, Va, Vc, Vd)
Ve (Va, Vc, Vd)
Va (Vc, Vd)
Vc (Vd)
Vd ( )

the computer is able to establish an ordered list of versions, as follows:

Vd→Vc→Va→Ve→Vb with Vb being the most recent state of the event. In particular, the latest version Vb can be displayed as the current state of the event to a user. As noted above, the communication protocol for sharing information between calendar-sharing computers pays no attention to the metadata contained in the different versions. This information is used effectively only by the calendar-sharing software provided on each calendar-sharing computer. From the point of view of the sharing protocol, a version is simply a version that is associated with a unique identifier. In the example above, the unique identifiers are a, b, c, d and e. When a new version is received by a calendar-sharing computer, it is simply added to the relevant event, with exactly the same status as the other existing versions for this event. So far as the communication protocol is concerned, the task concerning the new version has been completed. However, the calendar-sharing software provided on the receiving computer must use the metadata associated with the new version to establish how to treat it in relation to the other versions.

Figure 5A:
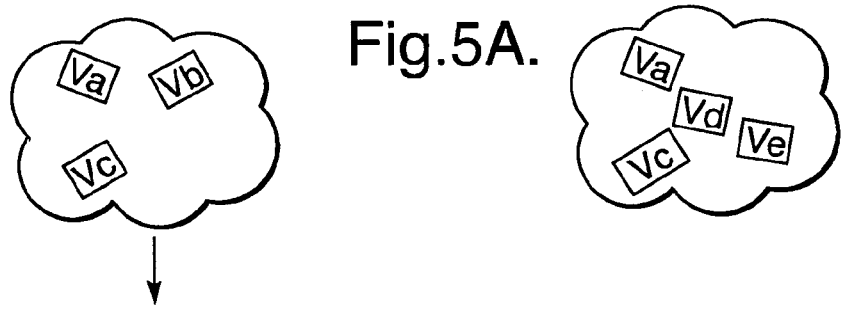
FIGS. 5A to C are illustrations of the synchronisation of an event between different calendar-sharing devices.
Figure 5B:
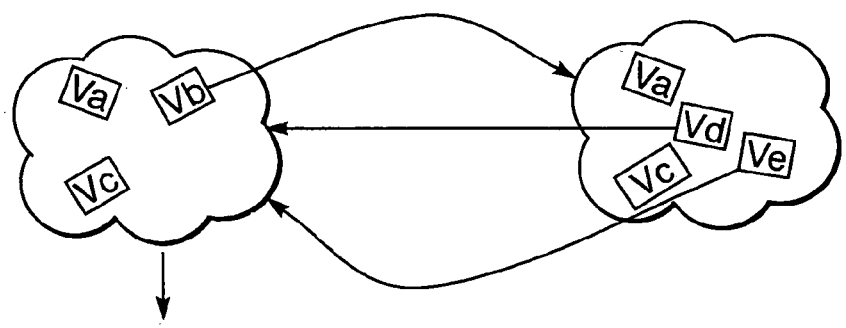
Figure 5C:
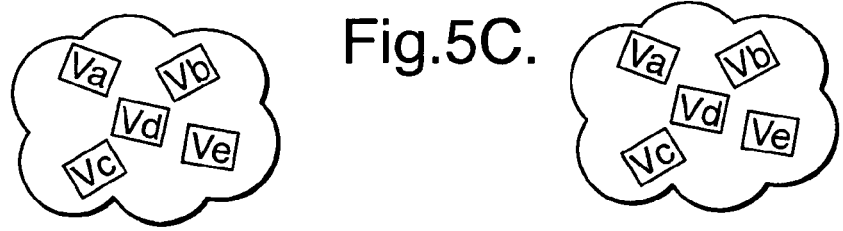

When an event needs to be synchronised between different calendar-sharing computers, or between a calendar-sharing computer and a server, the two devices compare what versions they hold for each event, as shown in FIG. 5A. They then transmit to one another the versions that they do not have in common, as shown in FIG. 5B, so that both devices have all the same versions, as shown in FIG. 5C. Where the device is a calendar-sharing computer, its calendar-sharing software will use the metadata to establish how to treat the event. Thus, where two calendar-sharing computers store the same versions of an event, they will treat that event the same. Where one of the devices is a server, it will simply act as a passive repository of data and store all versions without regard to the metadata.

In the foregoing example, the metadata signifies what versions of an event already existed when a new version was created. However, where one or more of the versions were created offline, this may not be sufficient data for a calendar-sharing computer to create an ordered list of versions. To overcome this problem, the metadata may instead or additionally include a time stamp indicating when the event was changed and the version created.

Figure 6:
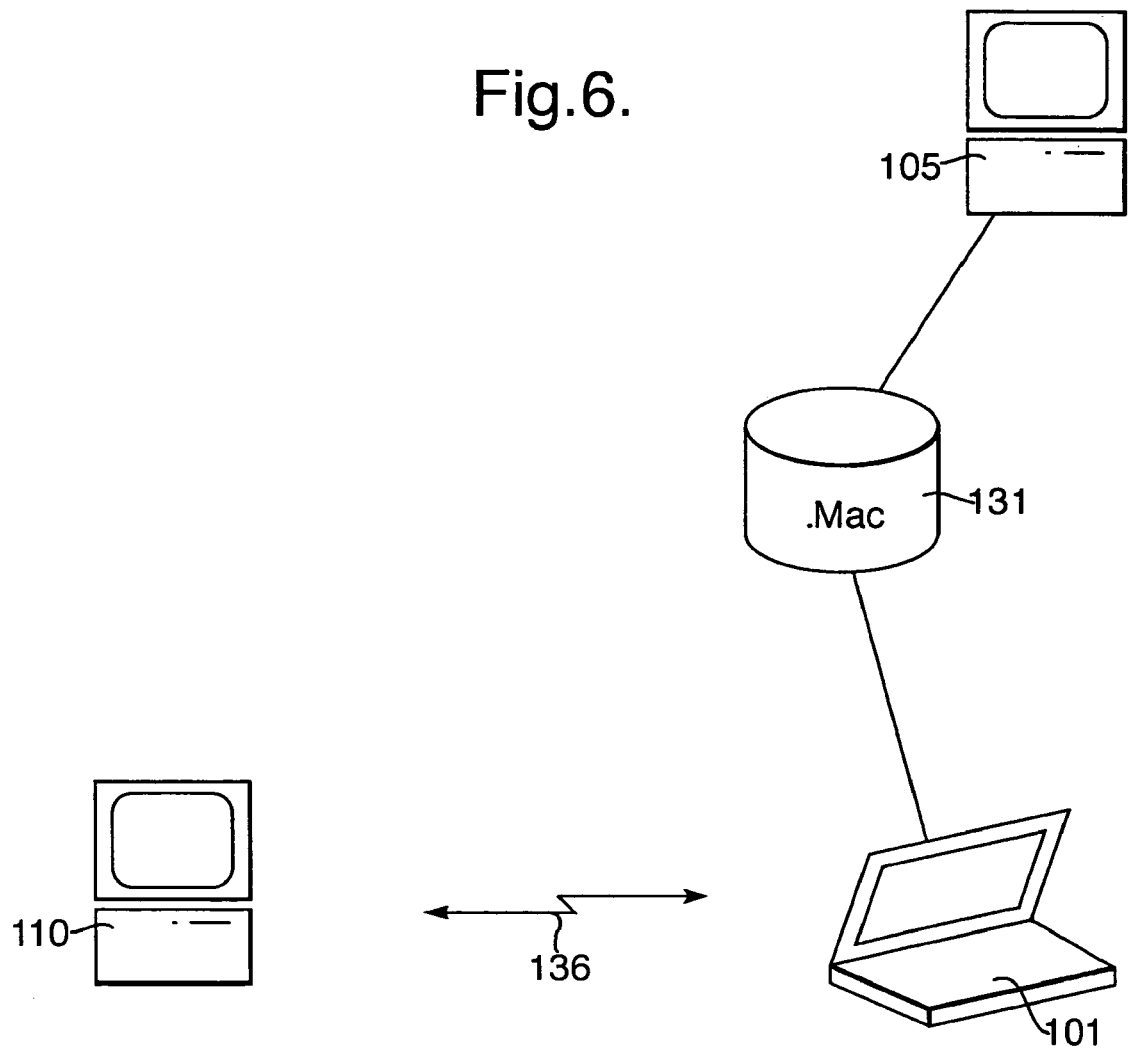
FIG. 6 is a schematic view of another network for sharing a calendar according to the present invention.

FIG. 6 shows another example of a network in which the present invention may be used. The network shown in FIG. 6 is similar to the network shown in FIG. 2 and like components have like reference numbers. However, the network shown in FIG. 6 does not include the third sub-network 140. Hence, LAN server 141 and additional desktop computers 115 and 120 are omitted. Again, a first user uses the laptop 106, which communicates with the second user's desktop 105 by means of the .Mac™ server 131 and with the third user's desktop 110 by means of the RendezVous™ network 135.

In step 1 of FIG. 7, the first user creates the first version $V_0$ of an event V. When the first user commits to creating that event, the created (or first) version $V_0$ is transmitted to .Mac™ server 131 and, when the second user goes online, from .Mac™ server 131 to the second user's desktop 105. At the same time, when the third user's desktop 110 and the first user's laptop 101 are networked, version $V_0$ is received by the third user's laptop 110. Accordingly, all three computers hold version $V_0$. This is shown in step 2 of FIG. 7. All users then go offline.

In step 3, the second user changes the event and creates version $V_1$. Since none of the users is online, only the second user's desktop 105 holds the new version $V_1$. When the second user goes online, version $V_1$ is uploaded to the .Mac™ server 131, but will not be sent to the first user's laptop 101 until he goes online by connecting to the .Mac™ server 131. When he does so, the new version is sent to laptop 101, as shown at step 4. However, at this stage there is no RendezVous™ network connection between laptop 101 and desktop 110 and desktop 110 therefore still does not hold version $V_1$.

In step 5, while still offline, the third user changes the original event independently of the change already made by the second user, thereby creating version $V_1'$. When the third user goes online by forming a wireless network connection between desktop 110 and laptop 101, the two computers compare the versions of the event that they hold respectively. This results in the new version $V_1'$ being sent to the laptop 101 and the previous version $V_1$ being sent to the desktop 110. Similarly, when the laptop 101 connects to the .Mac™ server 131 they compare the versions of the event that they hold and the new version $V_1'$ is sent to the .Mac™ server 131. Finally, when the second user goes online the desktop 105 receives the new version $V_1'$ from the .Mac™ server 131. Thus, as shown in step 6 all computers eventually hold all versions of the event, although they are received in a different order.

As illustrated in step 7, the calendar-sharing software on each computer uses the metadata for each version to determine how to deal with the different versions of the event. In this example, the metadata of each version includes a time stamp of when the version was created. Since it was created before version $V_1'$, the software on the third user's desktop 110 uses this data to "insert" version $V_1$ between versions $V_0$ and $V_1'$ and determine how and what data is displayed for the event accordingly.

Another example is shown in FIG. 8. In step 1, the first user again creates the first version $W_0$ of an event W. When the first user commits to creating that event, the created (or first) version $W_0$ is transmitted to .Mac™ server 131 and, when the second user goes online, from .Mac™ server 131 to the second user's desktop 105. At the same time, when the third user's desktop 110 and the first user's laptop 101 are networked, version $W_0$ is received by the third user's desktop 110. Accordingly, all three computers hold version $W_0$. This is shown in step 2 of FIG. 8. All users then go offline.

In step 3, the second user changes the event and creates version $W_1$. Since none of the users is online, only the second user's desktop 105 holds the new version $W_1$. When the second user goes online, version $W_1$ is uploaded to the .Mac™ server 131, but will not be sent to the first user's laptop 101 until he goes online by connecting to the .Mac™ server 131.

Before he does so, the third user changes the original version $W_0$ of the event independently of the change already made by the second user, thereby creating $W_1'$ (step 4). At this stage, the desktops 105, 110 are unaware of the new version the other has created and the first user's laptop 101 is unaware of either of the new versions.

When the third user's desktop 110 forms a wireless network connection with laptop 101, the two computers compare the respective versions of the event that they hold. This results in the new version $W_1'$ being sent to the laptop 101, as shown at step 5. However, at this stage there is no network connection between laptop 101 and desktop 105 and desktop 105 therefore still does not hold version $W_1'$.

In step 6, the laptop 101 connects to the .Mac™ server 131 and they compare the versions of the event that they hold. Thus, version $W_1'$ is sent to the .Mac™ server 131. Finally, when the second user goes online the desktop 105 receives the new version $W_1'$ from the .Mac™ server 131. In addition, the .Mac™ server has received the previous version $W_1$ from the desktop 105 and sends it to the laptop 101. Thus, as shown in step 6, all computers eventually hold all versions of the event.

As illustrated in step 7, the calendar-sharing software on each computer uses the metadata for each version to determine how to deal with the different versions of the event. In this example, the metadata of each version again includes a time stamp of when the version was created. Since it was created before version $W_1'$, the software on the third user's desktop 110 uses this data to "insert" version $W_1$ between versions $W_0$ and $W_1'$ and determine how and what data is displayed for the event accordingly. Similarly, the software on the second user's desktop 110 uses this data to "tack on" version $W_1'$ after versions $W_0$ and $W_1$, so that the same data is displayed in the same way for the event. Consequently, irrespective of the order in which the computers go online and communicate with one another, the software on each computer effects the display of the same data for each event to each user.

The metadata can be useful not only for presenting changes to users in the correct order. In a preferred embodiment of the present invention, the metadata also includes an indication of the user who made the change, the time at which the change was made, a description of the change and an optional comment added by the user who made the change. This metadata is then displayed to each user in the form of a history of the event.

Figure 9:
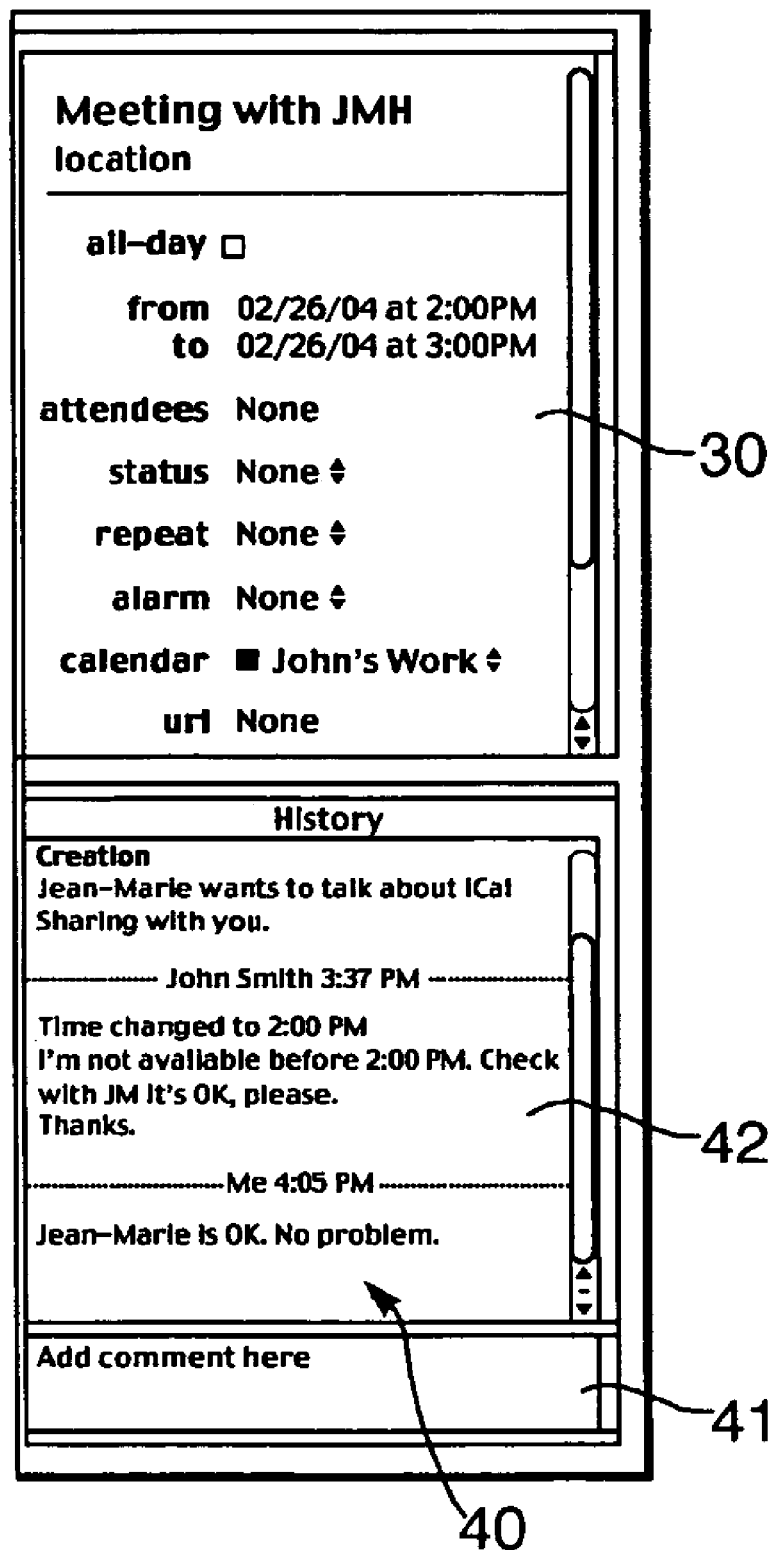
FIG. 9 is a view of an inspector box and a history box in a calendar user interface according to the present invention.

FIG. 9 shows an enlarged view of the inspector window 30, which allows the parameters of a particular event in a calendar to be viewed, and the history window 40 of a UI 10 equivalent to that shown in FIG. 1. The inspector window 30 shows the most up-to-date parameter data for the event—that is, the parameter data of the most recently created version of the event. In particular, the inspector window 30 shows that an event entitled "Meeting with JMH" is scheduled to start at 2:00 PM on Feb. 26, 2004 and to end at 3:00 PM the same day. The event is included in John's calendar, there are no attendees, there is no status, the event is not repeated and no alarms are set.

In contrast, the history window 40 shows the metadata for all versions of the event. In this example, the calendar belongs to John (Smith) and a meeting for between 1:30 PM and 3:00 PM was created as an event by his assistant Clara at 3:23 PM. The history window in FIG. 9 is the window shown to a user logged on to the computer as Clara. Accordingly, the history window shows that the event was created with the comment that "Jean-Marie wants to talk about iCal Sharing with you". Since Clara created the event, the history window does not show her, as the user, the time or creator of the event. However, other embodiments of the present invention may do so.

The history window in FIG. 9 also shows that John Smith changed the event at 3:37 PM. In particular, he changed the start time of the event to 2:00 PM and added the comment "I'm not available before 2:00 PM. Check with JM if it's OK, please. Thanks." Viewing the full screen shot of the UI 10 in FIG. 1, it is clear that the time of the JMH meeting was changed due to a dentist appointment between 1:00 PM and 2:00 PM. The dentist event could have been added after the JMH meeting event was created; Clara might not have had sharing access to the personal calendar in which the dentist appointment event is held; or Clara might have omitted to check the private calendar before creating the JMH meeting event.

Finally, the history window shows that after checking that the change was acceptable to Jean-Marie, Clara has simply added a message to the event that "Jean-Marie is OK. No problem." Although no change to the parameter data was made, a new version of the event was created with the metadata that the new version was created by Clara, the time of creation and the additional comment. This new version was transmitted to all computers that share John Smith's calendar.

Of course, the calendar main view 20 in the UI 10 will also show the event, but in the context of a day/date array. In particular, the main view 20 in FIG. 1 shows the meeting with JMH on Thu, February 26 at 2:00 PM after the dentist appointment. Although, the calendar main view shown in FIG. 1 shows a five-day view in day-based linear layout, the number of days in the view 20 can be changed. Alternatively, a grid layout may be used. In this example, all the events in the main view are shown as opaque, with the dentist appointment in the private calendar being shown in a darker colour than the appointments in the work calendar.

Figure 10A:
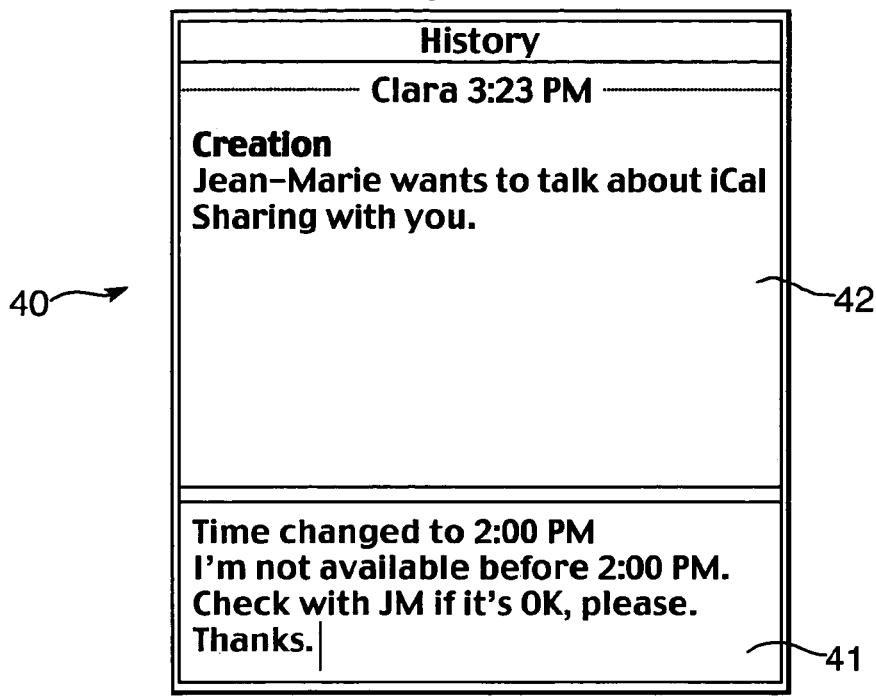
FIGS. 10A and B show changes to a history box in a calendar user interface according to the present invention.
Figure 10B:
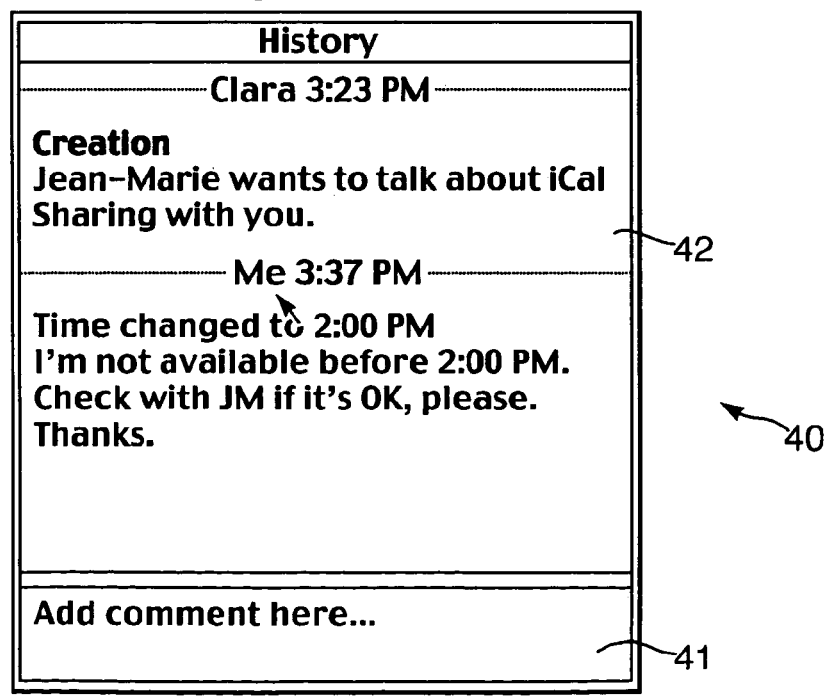

Further examples of history windows are shown in FIGS. 10A and B. In particular, FIGS. 10A and B show how the history window 40 viewed by John Smith changes in the above example. Specifically, in the window shown in FIG. 10A, John Smith is able to see that Clara has booked the appointment. He then changes the appointment to start at 2:00 PM and adds the comment "I'm not available before 2:00 PM. Check with JM if it's OK, please. Thanks." in the comment box at the bottom. At this stage, the change is local and is not sent to other calendar-sharing computers. As soon as John Smith confirms the modification to the appointment, the metadata of the new event is added in the history box 42 in the history window 40. Thus, in FIG. 10B as the registered user John Smith is able to see in the history box 42 that "Me" (that is, he himself) changed the event at 3.37 PM, how he changed it and the comment that he appended. The comment box 41 is now clear.

Figure 11:
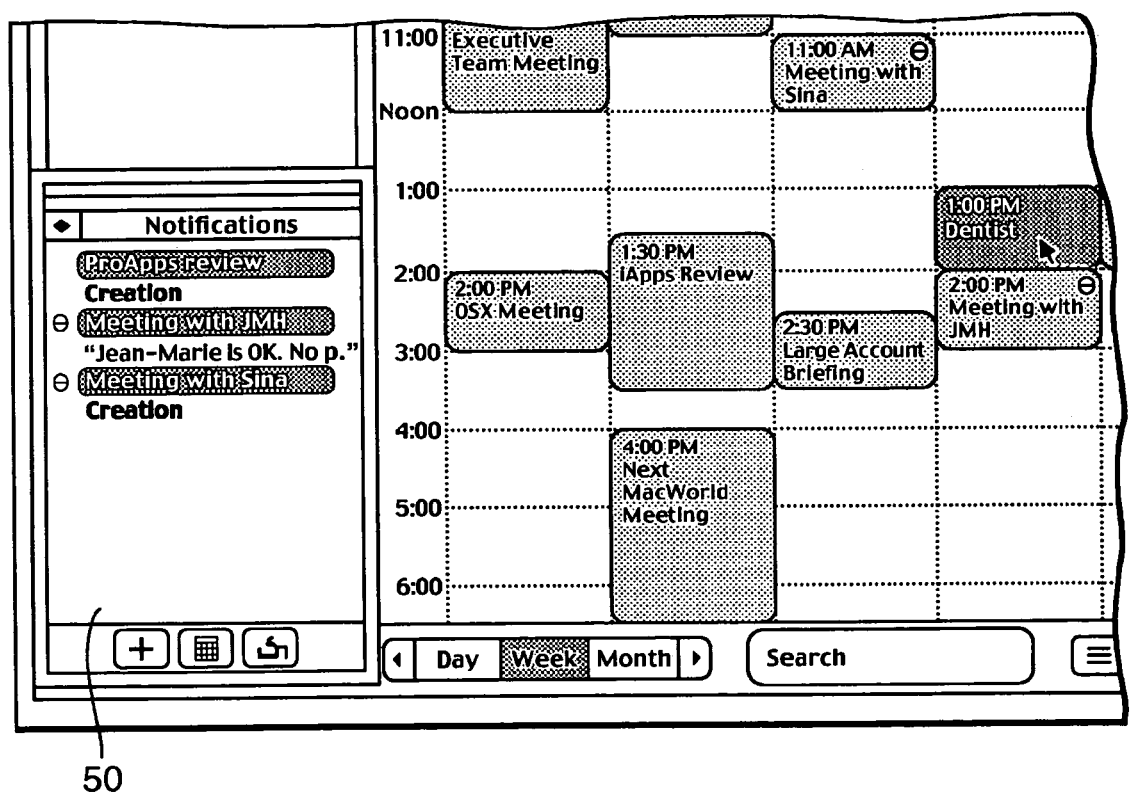
FIG. 11 is a view of a notification box in a calendar user interface according to the present invention.

A further advantage of the present invention is that the data structure allows a simple notification of users when an event has been changed by another user. In particular, as soon as a user's computer receives a new version of an event (or the first version of an event), it displays an indication of this in the notification window 50 shown in FIG. 1. An enlarged view of this window is shown in FIG. 11.

More specifically, as soon as the computer receives a new version of an event it can use the metadata to provide the user with a notification of the change. In the example shown in FIG. 11, the calendar-sharing program uses the metadata and the parameter data to display in the notification window 50 the title of the event and either the change that was made to the event or the comment appended to the changed event. Thus, the user is able to see that the events "Pro Apps Review" and "Meeting with Sina" have recently been created and the event "Meeting with JMH" has recently been modified. The bullet point to the left of each title indicates whether the user has already taken into account the modification. At the user's choice, audio, alternative visual and other alarms may be used to notify the user.

Of course, the notification window 50 may use a combination of any of the parameter data and metadata in the display.

In a further embodiment of the present invention, a notifications filter may be provided. This allows the user to select the events or calendars for which he requires notifications of a change (or for which he does not require notifications of a change). For example, imagine that an office administrator holds a separate calendar for each of ten meeting rooms available in an office. He shares those calendars with all members of staff, who are able to book time slots by creating an event in the appropriate calendar at the appropriate time. However, most members of staff will not require to be notified each time one employee books a time-slot in a meeting room and thereby creates a change in the calendar. The notification filter can be provided to filter out all notifications to a user of changes to the meeting room calendars unless he requests them. However, if a user has booked a time-slot on a meeting room calendar (and therefore created an event), he can set the notification filter to notify him only of modifications to that event—that is, only when a new version of that time-slot is received by the user's computer.

It will be clear from the foregoing description that the calendar-sharing data protocol of the present invention is essentially an "add only" protocol. In other words, all versions of an event are retained and none are deleted or destroyed during normal operation. This has the significant benefit that no dedicated calendar server software is required. Instead, all the "intelligence" is held by the computer programmed with the calendar-sharing software and the server, if used, merely acts as an "unintelligent" repository of the calendar data. More specifically, the computer programmed with the calendar-sharing software provides the intelligence to add metadata to each new version of an event and the intelligence to interpret a plurality of different versions of the same event and to display them meaningfully to the user. When a new version arrives in the computer programmed with the calendar-sharing software, it is simply added to the event, with exactly the same status as the other versions of the event. From the point of view of the sharing protocol, the task concerning the new version is completed. Of course the calendar-sharing software must then interpret the metadata to determine how the event should be displayed.

Further benefits of the protocol provided by the present include allowing a history of an event to be easily maintained and changes in an event to be notified to users. Moreover, the protocol is very versatile and highly adaptable. In particular, the protocol allows changes to an event in a calendar to be made using the local device on which the calendar is held, a .Mac™ server, a RendezVous™ network and any other suitable versioning server (such as a DeltaV server acting for a LAN). By a versioning server is meant any server that is capable of storing several versions of the same object. Generally, versioning servers store the different versions of an object in a particular order. However, in the present invention the different versions can be stored in any order, like a sack of potatoes. Direct data transfer between computers and other devices, for example by physical wiring, telephone communications, Bluetooth and other IR communication, are also possible.

As noted above, the sharing protocol of the present invention involves an "add only" rule. Accordingly, events are not deleted in the present invention. Rather, when a user wishes to delete an event, a new version of that event is created, the new version being marked "deleted". One example of how a deletion may be handled by the present invention is shown in FIG. 12.

Similar to FIGS. 7 and 8, user 1 creates an event $X_{00}$ (step 1) and sends it to users 2 and 3 (step 2). For the purposes of illustration, each user displays the event as rectangle in FIG. 12. In step 3, user 2 decides to delete the event. Accordingly, a new version of the event $X_x$ is created and user 2 no longer displays a rectangle.

In step 4, users 1 and 3 receive the new version $X_x$. Since they are not the creators of new version $X_x$, they display the event in a format indicating that it has been deleted. In FIG. 12, users 1 and 3 display the event as a rectangle with a cross through it. However, in the calendar main window 20, the "deleted" event could be shown in a number of ways. For example, it could be shown in red or another colour, or as translucent, or as a combination. Other suitable forms of display will be apparent to those skilled in the art.

Users 1 and 3 then have three options to decide how to treat the deletion by user 2. First, they can simply ignore the deletion and no further steps are taken. Second, they can choose to accept the deletion. Thus, step 5 shows that user 3 has accepted the deletion and no longer displays the rectangle. Effectively, the computer has been instructed to treat version $X_x$ by no longer displaying the event. Analogously, user 3's calendar main window 20 may no longer show the event. Note that users 2 and 3 still retain versions $X_{00}$ and $X_x$ but simply do not display them.

The third option is to reinstate the event. This is shown in step 6, in which user 1 has copied all the parameter data of version $X_{00}$ to create version $X_{01}$. However, version $X_{01}$ will have its own metadata, indicating who made the change, when and how. In step 7, the most recent version, $X_{01}$, is transmitted to users 2 and 3, which subsequently display the event.

In one embodiment, to save space or permanently prevent an event from being viewed, only the owner of the calendar may cause the event to be physically deleted. This option cannot be undone and involves removing all versions of the event and replacing the event everywhere with a token indicating that the event is now deleted and read-only. This is particularly important where a server is used to share the calendar data.

In addition, in a preferred embodiment users are able to move events from one calendar to another. Preferably, this entails copying an event in a first calendar, marking the event deleted in the first calendar and pasting the copied event to create a new event in a second calendar. The step of copying may involve copying all versions of the event, including the metadata for each version. In that case, the history of the event will be recoverable in the new calendar. Alternatively, only the most recently created version and its metadata need be copied. A further alternative is to copy only the parameter data but not the metadata of the most recently created version. In that case, no history will be retained for the event in the second calendar. Of course, a new history will be created as the event is changed in the second calendar. It will be apparent to persons skilled in the art that other options are possible when moving events between calendars.

In a preferred embodiment, duplication, cut, copy and paste operations within a calendar may also be performed. These steps are similar to the move operation described above. In particular, a cut and paste operation will involve copying the event (and at the user's option all versions of the event so the history is retained), marking the original event as deleted so it is no longer displayed, and pasting the event at a different location.

Since the sharing protocol of the present invention involves an "add only" rule, there is no way to "undo" a change in the traditional sense. To undo a change in the present invention, a user may select one of the previous versions of the event. The parameter data of that version are then copied to form a new version with new metadata. Of course, the original version and all intervening versions are maintained. Thus, the metadata may cause the history box 42 to display the creation of the new event as an undo.

Imagine for example that an event Y is created (version 0) with the parameter data (a) and this is changed to version 1 with parameter data (b). A series of changes could be represented as:

$Y_0(a) \rightarrow Y_1(b) \rightarrow Y_2(c) \rightarrow Y_3(d) \rightarrow Y_4(b)$.

In this case, after version $Y_3$ the user wished to undo the last two changes and revert to the event parameters of version 1. Accordingly, the parameter data (b) of version 1 was copied to form version 4. However, version 4 will have its own metadata and versions 1, 2 and 3 are maintained. Thus, the history box can show all the changes.

The present invention also allows users to schedule recurring events, such as a weekly meeting. However, as noted above, when a server is used to share calendars in the present invention, the server effectively acts as a passive repository of data. The present invention therefore treats recurring events as single objects involving a recurrence rule. The recurrence rule might involve, for example, setting the start and end dates of a recurring event and the frequency of the recurrence (daily, weekly, monthly, yearly etc).

Thus, when a recurrence rule changes, the individual events or occurrences are not modified separately. Rather, the whole set of recurring events is changed. However, a change to a recurrence rule may have the effect of modifying a single, specific occurrence in the set of recurrences. When a single, specific occurrence in the set of recurrences is changed, that occurrence may be considered as a detached occurrence.

Accordingly, in a preferred embodiment of the present invention the history of individual occurrences resulting from a recurrence rule comprises two parts. The first part displays the changes made to the specific selected occurrence or to all occurrences that do not involve a change to the recurrence rule itself. The second part displays the changes to the recurrence rule itself, for example any changes to the start date or end date of the recurrence rule.

The present invention has been described with particular reference to sharing a calendar between users on different computers. However, the present invention is not limited to the application of calendar sharing. Rather, it can be applied to any data set that can be considered to comprise a set of objects and which can be changed by any of a plurality of users. For example, the present invention could be used to share and edit collections of photographs or other images by user groups. In that case, each image would be considered as a separate object, the parameters of the object being the image data. Each time an image is edited, a new version would be created with new metadata relating to the change and the history and notification boxes would be updated appropriately. As with the calendar-sharing application discussed above, the history box could show the time the change was made; an indication of the previous version that was changed to create the new version; an indication of what change was made; and an indication of who made the change.

In another embodiment, the present invention allows a collaborative document to be authored by several people. In that case, the document can be considered as a collection of paragraphs (or chapters and/or other sections such as images, as determined by the users), the parameter data relating to the text and formatting of each paragraph or other section and the metadata relating to the time the change was made; an indication of the previous version that was changed to create the new version; an indication of what change was made; and an indication of who made the change.

Other implementations of the present invention will be immediately apparent to those skilled in the art.

The foregoing description has been given by way of example only and it will be appreciated by a person skilled in the art that modifications can be made without departing from the spirit and scope of the present invention.

We claim:

1. A method of sharing a group of one or more objects between a plurality of users, in which one or more of said plurality of users is able to change parameter data of at least one said object, the method comprising:
   reading program code from a first memory and processing said program code with a first processing unit performing,
      storing at least one version of each said object, wherein the group is a calendar and wherein each object is an event in the calendar, and wherein the parameter data comprises at least one of a start time of the event, an end time of the event, and a description of the event, when the object is changed, creating a new version of the object, the new version of the object comprising additional data relating to the creating of the new version,
      storing the new version of the object together with the at least one version of the object before the change, and
      transmitting the new version of the object over a network connection, and
   reading program code from a second memory and processing said program code with a second processing unit performing,
      comparing a remote version of the object with the new version of the object over the network connection based on the additional data,
      determining a sequence relationship between the remote version of the object and the new version of the object based on the comparison, and
      displaying the object in accordance with the determined sequence relationship, wherein the sequence relationship determines a previous version of the object and a recent version of the object from the remote version of the object and the new version of the object, and wherein the displaying displays the recent version of the object, the displaying not displaying the previous version of the object.

2. The method according to claim 1, wherein the parameter data further comprises at least one of a status of the event, whether the event is to be repeated and persons attending the event.

3. The method according to claim 1 or claim 2, wherein the additional data comprises at least one of an identification of the user who made the change, a time at which the change was made, a description of the change, a user comment relating to the change and an identification of the previous version of the event from which the new version was created.

4. The method according to claim 1, wherein the additional data comprises the time at which the change was made, the method further comprising displaying the most recently changed version of the object.

5. The method according to claim 1, wherein the additional data comprises an identification of the previous version of the event from which the present version was created.

6. The method according to claim 1, the method further comprising displaying one version of the object together with the additional data of another version of the object.

7. The method according to claim 6, wherein the additional data displayed includes at least one of an identification of the user who made the change, the time at which the change was made, a description of the change, a user comment relating to the change and an identification of the previous version of the object from which the new version was created.

8. The method according to claim 1, the method further comprising sharing the group of objects between the plurality of users by means of user devices in a network.

9. The method according to claim 8, the method further comprising storing all versions of objects in user devices accessed by users.

10. The method according to claim 9, the method further comprising storing all versions of objects in a network server.

11. The method according to any one of claims 8 to 10, wherein a first user device and a second user device connected in the network compares all versions of the objects stored in a same group.

12. The method according to claim 11, wherein the first user device receives from the second device versions of the objects not stored by the first user device.

13. The method according to claim 11, wherein the first user device transmits to the second device versions of the objects not stored by the second device.

14. The method according to claim 1, wherein when a user deletes the object from the group, the method comprises:
creating a new version of the object with additional data indicating that the object is deleted,
storing the new version of the object together with any version of the object before the deletion, and
displaying the object with an indication that the object has been deleted.

15. The method according to claim 1 or claim 14, wherein when a predetermined one of said plurality of users deletes the object from the group, the method comprises:
deleting all versions of the object and replacing the object with a token indicating that the object has been deleted and can no longer be changed.

16. The method according to claim 1, the method further comprising sharing a plurality of groups of objects.

17. The method according to claim 16, the method further comprising moving an object from a first group to a second group.

18. The method according to claim 17, the step of moving an object from a first group to a second group comprising copying all versions of the object in the first group and storing the object in the second group.

19. The method according to claim 1, the method further comprising selecting an existing version of an object, copying the parameter data of the selected version and storing the parameter data with additional data as a new version of the object.

20. The method according to claim 1, further comprising notifying one or more of said users when an object is changed.

21. A computer readable medium encoded with a plurality of computer-executable instructions being executed by a processing system for causing the processing system to perform a method of sharing a group of one or more objects between a plurality of users, in which one or more of said plurality of users is able to change parameter data of at least one said object, the method comprising:
reading program code from a first memory and processing said program code with a first processing unit performing,
storing at least one version of each said object, wherein the group is a calendar and wherein each object is an event in the calendar, and wherein the parameter data comprises at least one of a start time of the event, an end time of the event, and a description of the event,
when the object is changed, creating a new version of the object, the new version of the object comprising additional data relating to the creating of the new version,
storing the new version of the object together with the at least one version of the object before the change, and
transmitting the new version of the object over a network connection,
reading program code from a second memory and processing said program code with a second processing unit performing,
comparing a remote version of the object with the new version of the object over the network connection based on the additional data,
determining a sequence relationship between the remote version of the object and the new version of the object based on the comparison, and
displaying the object in accordance with the determined sequence relationship, wherein the sequence relationship determines a previous version of the object and a recent version of the object from the remote version of the object and the new version of the object, and wherein the displaying displays the recent version of the object, the displaying not displaying the previous version of the object.

22. A recording medium having recorded thereon a computer program for causing a computer to carry out a method of sharing a group of one or more objects between a plurality of users, in which one or more of said plurality of users is able to change parameter data of at least one said object, the method comprising:
reading program code from a first memory and processing said program code with a first processing unit performing,
storing at least one version of each said object, wherein the group is a calendar and wherein each object is an event in the calendar, and wherein the parameter data comprises at least one of a start time of the event, an end time of the event, and a description of the event,
when the object is changed, creating a new version of the object, the new version of the object comprising additional data relating to the creating of the new version, and
storing the new version of the object together with the at least one version of the object before the change;
reading program code from a second memory and processing said program code with a second processing unit performing,
transmitting the new version of the object over a network connection,
comparing a remote version of the object with the new version of the object over the network connection based on the additional data,
determining a sequence relationship between the remote version of the object and the new version of the object based on the comparison, and
displaying the object in accordance with the determined sequence relationship, wherein the sequence relationship determines a previous version of the object and a recent version of the object from the remote version of the object and the new version of the object, and wherein the displaying displays the recent version of the object, the displaying not displaying the previous version of the object.

23. A method of operating a network comprising at least a first user device and a second user device, wherein said user devices are arranged to carry out a method of sharing a group of one or more objects between a plurality of users, in which one or more of said plurality of users is able to change parameter data of at least one said object, the method comprising:
reading program code from a first memory and processing said program code with a first processing unit performing, storing at least one version of each said object, wherein the group is a calendar and wherein each object is an event in the calendar, and wherein the parameter data comprises at least one of a start time of the event, an end time of the event, and a description of the event, when the object is changed, creating a new version of the object, the new version of the object comprising additional data relating to the creating of the new version, and storing the new version of the object together with the at least one version of the object before the change;

reading program code from a second memory and processing said program code with a second processing unit performing, transmitting the new version of the object over a network connection, comparing a remote version of the object with the new version of the object over the network connection based on the additional data, determining a sequence relationship between the remote version of the object and the new version of the object based on the comparison, and displaying the object in accordance with the determined sequence relationship, wherein the sequence relationship determines a previous version of the object and a recent version of the object from the remote version of the object and the new version of the object, and wherein the displaying displays the recent version of the object, the displaying not displaying the previous version of the object.

24. The method according to claim 23, further comprising a server.

25. A method of operating a user device to carry out a method of sharing a group of one or more objects between a plurality of users, in which one or more of said plurality of users is able to change parameter data of at least one said object, the method of sharing comprising:

reading program code from a first memory and processing said program code with a first processing unit performing, storing at least one version of each said object, wherein the group is a calendar and wherein each object is an event in the calendar, and wherein the parameter data comprises at least one of a start time of the event, an end time of the event, and a description of the event, when the object is changed, creating a new version of the object, the new version of the object comprising additional data relating to the creating of the new version, and storing the new version of the object together with the at least one version of the object before the change;

reading program code from a second memory and processing said program code with a second processing unit performing, transmitting the new version of the object over a network connection, comparing a remote version of the object with the new version of the object over the network connection based on the additional data, determining a sequence relationship between the remote version of the object and the new version of the object based on the comparison, and displaying the object in accordance with the determined sequence relationship, wherein the sequence relationship determines a previous version of the object and a recent version of the object from the remote version of the object and the new version of the object, and wherein the displaying displays the recent version of the object, the displaying not displaying the previous version of the object.

26. A method of sharing a group of one or more objects between a plurality of users, in which one or more of said plurality of users is able to change parameter data of at least one said object, the method comprising:

reading program code from a first memory and processing said program code with a first processing unit performing, storing at least one version of each said object, when the object is changed, creating a new version of the object, the new version of the object comprising additional data relating to the creating of the new version, and storing the new version of the object together with the at least one version of the object before the change;

reading program code from a second memory and processing said program code with a second processing unit performing, transmitting the new version of the object over a network connection, comparing a remote version of the object with the new version of the object over the network connection based on the additional data, providing all versions of the object to each of said plurality of users, the all versions including the remote version, using the additional data provided for each version of the object to determine how to display the object, and displaying the object, in a calendar user interface, in accordance with a sequence of changes established according to relationships between different versions of the object, wherein the group is a calendar and each object is an event in the calendar, wherein the parameter data includes at least one of a start time of the event, an end time of the event, and a description of the event, wherein the sequence relationship determines a previous version of the object and a recent version of the object from the remote version of the object and the new version of the object, and wherein the displaying displays the recent version of the object, the displaying not displaying the previous version of the object.

27. The method according to claim 26, wherein the parameter data further comprises at least one of a status of the event, whether the event is to be repeated and persons attending the event.

28. The method according to claim 26 or claim 27, wherein the additional data comprises at least one of an identification of the user who made the change, a time at which the change was made, a description of the change, a user comment relating to the change and an identification of the previous version of the event from which the new version was created.

29. The method according to claim 26, wherein the additional data comprises the time at which the change was made, the method further comprising displaying the most recently changed version of the object.

30. The method according to claim 26, wherein the additional data comprises an identification of the previous version of the event from which the present version was created.

31. The method according to claim 26, the method further comprising displaying one version of the object together with the additional data of another version of the object.

32. The method according to claim 31, wherein the additional data displayed includes at least one of an identification of the user who made the change, the time at which the change was made, a description of the change, a user comment relating to the change and an identification of the previous version of the object from which the new version was created.

33. The method according to claim 26, the method further comprising sharing the group of objects between the plurality of users by means of user devices in a network.

34. The method according to claim 33, the method further comprising storing all versions of objects in user devices accessed by users.

35. The method according to claim 34, the method further comprising storing all versions of objects in a network server.

36. The method according to any one of claims 33 to 35, wherein a first user device and a second user device connected in the network compares all versions of the objects stored in a same group.

37. The method according to claim 36, wherein the first user device receives from the second device versions of the objects not stored by the first user device.

38. The method according to claim 36, wherein the first user device transmits to the second device versions of the objects not stored by the second device.

39. The method according to claim 26, wherein when a user deletes the object from the group, the method comprises:

creating a new version of the object with additional data indicating that the object is deleted, storing the new version of the object together with any version of the object before the deletion, and displaying the object with an indication that the object has been deleted.

40. The method according to claim 26 or claim 39, wherein when a predetermined one of said plurality of users deletes the object from the group, the method comprises:

deleting all versions of the object and replacing the object with a token indicating that the object has been deleted and can no longer be changed.

41. The method according to claim 26, the method further comprising sharing a plurality of groups of objects.

42. The method according to claim 41, the method further comprising moving an object from a first group to a second group.

43. The method according to claim 42, wherein the moving of an object from a first group to a second group comprising copying all versions of the object in the first group and storing the object in the second group.

44. The method according to claim 26, the method further comprising selecting an existing version of an object, copying the parameter data of the selected version and storing the parameter data with additional data as a new version of the object.

45. The method according to claim 26, further comprising notifying one or more of said users when an object is changed.

* * * * *